United States Patent [19]

Takeuchi et al.

[11] 4,288,145

[45] Sep. 8, 1981

[54] FIBER FOR OPTICAL COMMUNICATIONS

[75] Inventors: Tadashi Takeuchi, Higashikurume; Taiji Yamabe, Yokohama, both of Japan

[73] Assignee: Daicel Ltd., Osaka, Japan

[21] Appl. No.: 25,950

[22] Filed: Apr. 2, 1979

[30] Foreign Application Priority Data

Apr. 10, 1978 [JP] Japan ................... 53-41975

[51] Int. Cl.$^3$ ............... D02G 3/00; G02B 5/14
[52] U.S. Cl. .................. 350/96.34; 350/96.30; 428/375; 428/391; 428/392
[58] Field of Search ........... 428/373, 374, 375, 378, 428/391, 392, 394, 395; 528/323, 324, 325, 326, 336; 260/31.2 N, 30.8 R; 525/184, 424, 432; 350/96.33, 96.34, 96.30

[56] References Cited

U.S. PATENT DOCUMENTS

| | | | |
|---|---|---|---|
| Re. 27,939 | 3/1974 | Raabe .................... | 528/325 |
| 3,950,297 | 4/1976 | Raabe .................... | 528/325 X |
| 3,980,390 | 9/1976 | Yamamoto et al. ......... | 350/96.33 X |
| 3,999,834 | 12/1976 | Ohtomo et al. ........... | 350/96.34 |
| 4,072,400 | 2/1978 | Claypoole et al. ......... | 350/96.33 X |
| 4,105,284 | 8/1978 | Olshansky ............... | 350/96.33 |
| 4,147,407 | 4/1979 | Eichenbaum et al. ....... | 350/96.34 |
| 4,167,305 | 9/1979 | Ichiba et al. ............ | 350/96.34 |

*Primary Examiner*—Lorraine T. Kendell
*Attorney, Agent, or Firm*—Blanchard, Flynn, Thiel, Boutell & Tanis

[57] ABSTRACT

A low-loss optical fiber core for optical communications is covered with at least one layer of a polylaurolactam copolymer composed of 20 to 98 parts by weight of laurolactam and 80 to 2 parts by weight of a polyamide-forming monomer other than laurolactam, said copolymer having a melting point within a range of 100° C. to 170° C.

11 Claims, No Drawings

FIBER FOR OPTICAL COMMUNICATIONS

The present invention relates to the construction of a fiber for optical communications having excellent transmission characteristics as well as great mechanical strength.

Fibers for optical communications are usually made of a low-loss quartz or an optical glass which are brittle materials. In order to make optical fiber cables for communications, therefore, studies have been directed toward reinforcing them in respect to the mechanical strength by covering their cores with a plastic material or the like. The optical fiber cables of this type, however, present such defects as breakage in the cores of optical fibers and degradation of the transmission characteristics when external pressures, impact or bending stresses have been applied thereto. Therefore, polyethylene and nylon, which are crystalline thermoplastic resins having excellent mechanical and chemical properties, have been proposed as materials for covering the cores of optical fibers, and at present, nylon 12 is regarded as the most suitable covering material (See Japanese patent application Laid-Open No. 17649/75 and U.S. Pat. No. 3,980,390). Even the covering material composed of nylon 12, however, leaves room for improvement as mentioned below.

It is seen during the covering step that crystalline nylon 12 homopolymer coated on fibers gets more and more stable in respect to the crystallization degree just from the molding until about 48 hours have passed. Therefore, the loss of optical transmission of the core of the optical fiber is gradually decreased from about 100 dB/Km to 1 dB/Km or less. Accordingly, the products cannot be inspected during the step of manufacturing; the products must be inspected after the transmission loss has been stabilized, i.e., after 48 hours have passed from the step of molding. Otherwise, the optical fiber just after the step of molding must be subjected to annealing under predetermined conditions to decrease the transmission loss before it is shipped. Moreover, materials such as quartz and optical glass used as the core of the optical fibers tend to be chemically deteriorated by oxidation and moisture. To prevent this deterioration, therefore, a primer has been applied to the cores of the optical fibers. However, since the nylon 12 homopolymer is molded at such a relatively high temperature as approximately 200° C., the primer may undergo thermal decomposition depending upon the particular case, thereby degrading the performance of the core of the optical fibers. The kinds of usable primers are therefore greatly limited.

The inventors of the present invention have conducted research and discovered the fact that a copolymer composed of 20 to 98 parts by weight of laurolactam and 80 to 2 parts by weight of a nylon-forming monomer other than laurolactam and having a melting point of 100° to 170°, exhibits a very small crystallization degree when it is used to cover the core of the optical fiber as compared with the case of polylaurolactam alone and, therefore, exhibits little change with the passage of time regarding the crystallization degree. Therefore, using the abovementioned copolymer, there is no need to perform the inspection after 48 hours have passed from the molding step, which inspection is necessary when polylaurolactam alone is used, and there is also no need to adjust the time of shipment.

It was further discovered that there is no need to effect the abovementioned annealing to reduce the transmission loss to be less than 1 dB/Km, or that, even if the annealing is necessary, it is possible that it is carried out under relatively mild conditions.

Furthermore, the optical fibers covered with nylon 12 alone lack flexibility because nylon 12 exhibits a modulus of elasticity of greater than 12,000 kg/cm². Using the copolymer of nylon 12 according to the present invention, on the contrary, the flexibility can be greatly increased, whereby the bundling step may be carried out with ease. Besides, the cores of the optical fibers according to the invention are free from nonuniform stress, and therefore the optical transmission loss is constant over extended periods of time after the cables have been installed. The present invention has been completed based upon the abovementioned discoveries.

The nylon-forming monomer is a lactam having 4 to 16 carbon atoms, an amino-carboxylic acid having 4 to 16 carbon atoms and a salt of an alkylenediamine having 4 to 16 carbon atoms and an alkylenedicarboxylic acid having 4 to 16 carbon atoms.

The lactam includes caprolactam and caprylolactam. The amino-carboxylic acid includes ω-aminopelargonic acid, ω-amino-undecanoic acid and 13-aminotridecanoic acid. The alkylenediamine includes hexamethylenediamine, decamethylenediamine, tridecanediamine and 2,2,4-trimethyl-hexa-diamine. The alkylenedicarboxylic acid includes adipic acid, sebacic acid, dodecanedicarboxylic acid and tridecanedicarboxylic acid. The ratio of copolymerization is so selected that the melting point of the copolymerized polyamide ranges from 100° to 170° C. The copolymerized polyamide to be employed by the present invention can be prepared by a well known method using laurolactam and one or more polyamide-forming monomers.

The melting point of the copolymer according to the invention may be determined by means of a differential scanning calorimeter, according to which, the melting point is the temperature whereat the maximum heat absorption appears when the temperature is increased at a rate of 16° C. per minute.

According to the invention, one or more nylon-forming monomers may be used.

The copolymer according to the invention is preferred to have a relative viscosity in a range between 1.5 and 2.4 where it is measured in the form of its 0.5 wt.% m-cresol solution at 25° C.

More preferably, the abovementioned copolymer consisting of 20 to 98 parts by weight of laurolactam and 80 to 2 parts by weight of the other polyamide-forming monomer(s) may further be admixed with less than 20 parts by weight of a plasticizer or a plastic material having compatibility therewith in order to enhance the moldability and reduce the nonuniform distortion that may be otherwise exerted on the cores of the optical fibers.

Examples of the plasticizer for the polylaurolactam copolymer will include aromatic hydroxy derivatives such as 2-ethylhexyl-para-hydroxybenzoate, and amide sulfonate such as benzenesulfonebutylamide. Examples of the compatible plastic material include polyurethane, ethylene/vinyl acetate copolymer, modified polyethylene and other copolymeric nylons.

The abovementioned merits resulting from the use of the polylaurolactam copolymer are attributed to the below-mentioned reasons. That is, non-continuous spaces are formed between the core of the optical fiber and the coating film, and the portions where the spaces come into contact with the core of the optical fiber give unbalanced distortion to the core of the optical fiber. However, the plasticizer evolved from the resin heated during the step of molding forms a layer between the core of the optical fiber and the resin which is the coating film to uniformly disperse the unbalanced distortion.

It has further been discovered that the loss of optical transmission can be reduced by forming a uniform plasticizer layer between the core of the optical fiber and the resin layer by means of annealing.

The copolymerized polyamide consisting of 20 to 98 parts by weight of the laurolactam and 80 to 2 parts by weight of the other polyamide-forming monomer and having a melting point of lower than 100° C., lacks resistance against heat, and cannot stably maintain the characteristics of fibers for optical communications for extended periods of time. Therefore, such a copolymerized polyamide is not suited for use as a cable sheath material. The copolymerized polyamide having a melting point of higher than 170° C., on the other hand, causes the primer to be thermally degraded although it is used for the purpose of preventing the core of the optical fiber from being deteriorated by oxidation. When the copolymerized polyamide having a melting point higher than 170° C. is used, therefore, it is necessary to select a special primer which will be thermally degraded to a lesser extent. As mentioned earlier, therefore, it is necessary to carry out the molding at a temperature as low as possible and not higher than 200° C., thereby also to economically perform the molding step. For this purpose, the melting point of the polylaurolactam copolymer must be lower than 170° C.

In producing the fiber for optical communications according to the present invention, the covering layer of polylaurolactam copolymer can be formed on the core of the optical fiber by any known method of forming the covering layer. The most suitable method, however, is to melt the resin composition and to cover the core of the optical fiber by extruding the resin composition onto the core. Namely, the resin composition is melted by means of a screw extruder and is coated on the core by way of a drawing method (inclusive of vacuum lining method), or the resin composition is melted by any suitable method and is extruded by means of a gear pump to apply it to the core.

The thus obtained fiber for optical communications is then covered on its outer surface with a protective layer to make an optical fiber cable. Such a cable can be manufactured in the same manner as the conventional optical fiber cables. A plurality of the coated optical fibers may be formed into one cable by enveloping it with a thermoplastic resin for the sheath.

As shown above, the fiber for optical communications according to the invention has a coating layer on the surface. Practical embodiments of the invention may include an optical fiber having thereon at least one coating layer of the laurolactam copolymer and at least one coating layer of another resin such as below listed. It is furthermore added that the coating layer is preferred to be either single or double. In the case with the double layers, the outer is composed of the copolymer according to the invention and the inner may be composed of a resin different from that of the outer layer. The resin as a basic ingredient in the resin composition used herein can be of any types such as thermoplastic or, thermosetting types and the like and, from the view point of the adhesion to the glass fiber, includes, for example, polyester, polyamide, polyacetal, polyvinylacetal, polysulfone, polyurethane, polyether, polyesterimide, polyamideimide, polyimide, polyacrylate, polyvinylacetate, ethylenevinylacetate copolymer, ethyleneacrylic acid copolymer, epoxy resin, phenol resin, resorcinal resin, unsaturated polyester resin, urea resin, furan resin, silicone resin, alkyd resin, melamine resin, diallylphthalate resin, etc. or the derivatives thereof.

One of the practical embodiments of the invention is a fiber having three coating layers composed of silicone resin, nylon 12 copolymer and polyethylene or polyvinyl chloride, respectively, from the inside to the outside.

The low-loss optical fiber core to be used in the invention may include all conventional ones, such as those of the glass-clad type, the self focussing type and the single material type.

Examples of the present invention are mentioned below. Data on the relative viscosity are obtained by measurement as defined before.

EXAMPLE 1

A fiber for optical communications was obtained by forming a 300-micron coating of a copolymer of 80 parts by weight of laurolactam and 20 parts by weight of caprolactam on the core of a quartz glass-clad optical fiber of a diameter of 200 microns by means of drawing dies using a nylon extruder having a diameter of 40 mm. The optical transmission loss of the optical communications fiber just after it was molded was measured to be 14 dB/Km, and was measured to be 6 dB/Km after 24 hours had passed since molding. The relative viscosity of the copolymer was 1.9 and the melting point is 155° C.

The thus obtained fiber for optical communications was very flexible, transparent, and possessed sufficient mechanical properties for use as a cable sheath material.

EXAMPLE 2

A fiber for optical communications was obtained in the same manner as in Example 1, except that the used copolymer consisted of 80 parts by weight of laurolactam and 20 parts by weight of a salt of hexamethylenediamine and dodecane dicarboxylic acid, said copolymer having a relative viscosity of 1.8 and the melting point is 155° C. The optical transmission loss of the obtained optical communications fiber was 25 dB/Km where measured just after the molding and 10 dB/Km in 24 hours.

EXAMPLE 3

An extremely flexible fiber for optical communications was obtained by forming a 300-micron coating of a tercopolymer composed of 34 parts by weight of laurolactam, 33 parts by weight of caprolactam and 33 parts by weight of hexamethylenediamine adipate on the core of the same fiber as that of Example 1. The relative viscosity of the copolymer was 1.8 and the melting point is 115° C.

The optical transmission losses were measured to be nearly the same as those of Example 1.

EXAMPLE 4

A fiber for optical communications having excellent properties was obtained by forming a 300-micron coating on the core of the same fiber as that of Example 1 using pellets consisting of a copolymer of 80 parts by weight of laurolactam and 20 parts by weight of caprolactam admixed with 10 parts, based on 100 parts of the copolymer, of a plasticizer (benzenesulfonebutylamide). The relative viscosity of the copolymer was 1.9.

The optical transmission loss of the fiber for optical communications was measured to be less than 1.0 dB/Km after it was annealed at 80° C. for 24 hours, thus giving very good results.

COMPARATIVE EXAMPLE

Two fibers for optical communications were obtained by forming a 300-micron coating of a copolymer composed of 80 parts by weight of laurolactam and 20 parts by weight of caprolactam and forming a 300-micron coating of a homopolymer of laurolactam on the respective cores under the same condition as in Example 1. The former product is the same as that of Example 1.

Characteristics of the two fibers for optical communications were measured to be as follows:

|  | Copolymer | Homopolymer |
|---|---|---|
| Drawing ratio (moldability) | 20 times | 8 times |
| Transmission loss (just after molding) | 14 dB/Km | 70 dB/Km |
| Change of transmission loss with the passage of time (after 48 hours had passed) | 6 dB/Km | 15 dB/Km |
| Flexibility of the optical fibers | high | low |

What is claimed is:

1. A fiber for optical communication comprising a low-loss optical fiber core for optical communication, said core being covered with at least one coating layer of a polylaurolactam copolymer, said copolymer consisting essentially of 20 to 98 parts by weight of laurolactam and 80 to 2 parts by weight of one or more polyamide-forming monomers different from laurolactam, said polyamide-forming monomers being selected from the group consisting of lactams having 4 to 16 carbon atoms, amino carboxylic acids having 4 to 16 carbon atoms and salts of alkylene ($C_4$–$C_{16}$) diamines and alkylene ($C_4$–$C_{16}$) dicarboxylic acids, said copolymer having a melting point within the range of 100° C. to 170° C.

2. A fiber for optical communication as claimed in claim 1 in which said layer further contains up to 20 parts of a plasticizer and/or another synthetic resin.

3. A fiber for optical communication as claimed in claim 1, in which said core is coated with only one polylaurolactam copolymer layer.

4. A fiber for optical communication as claimed in claim 1, in which said core is additionally coated with one or more additional layers composed of a thermoplastic resin different from said polylaurolactam copolymer, said additional layer or layers being coated on either the inside or the outside of the polylaurolactam copolymer layer.

5. A fiber for optical communication as claimed in claim 4, in which said core is coated with two layers, the outer layer being composed of said polylaurolactam copolymer and the inner layer being composed of another resin composition.

6. A fiber for optical communication as claimed in claim 1 in which said copolymer has a relative viscosity in a range of from 1.5 to 2.4, measured in a 0.5 wt.% solution thereof in m-cresol at 25° C.

7. A fiber for optical communication as claimed in claim 1, in which said core is coated with three layers, the innermost layer consisting essentially of silicone resin, the intermediate layer consisting essentially of said polylaurolactam copolymer and the outermost layer consisting essentially of polyethylene or polyvinyl chloride.

8. A fiber for optical communication as claimed in claim 1 in which said copolymer consists of a copolymer of 80 parts by weight of laurolactam and 20 parts by weight of caprolactam.

9. A fiber for optical communication as claimed in claim 1 in which said copolymer consists of a copolymer of 80 parts by weight of laurolactam and 20 parts by weight of a salt of hexamethylenediamine and dodecane dicarboxylic acid.

10. A fiber for optical communication as claimed in claim 1 in which said copolymer consists of a copolymer of 34 parts by weight of laurolactam, 33 parts by weight of caprolactam and 33 parts by weight of hexamethylenediamine adipate.

11. A fiber for optical communication as claimed in claim 1 in which said core is coated with two layers, the inner layer consisting essentially of silicone resin and the outer layer consisting essentially of said polylaurolactam copolymer.

* * * * *